Figure 1:
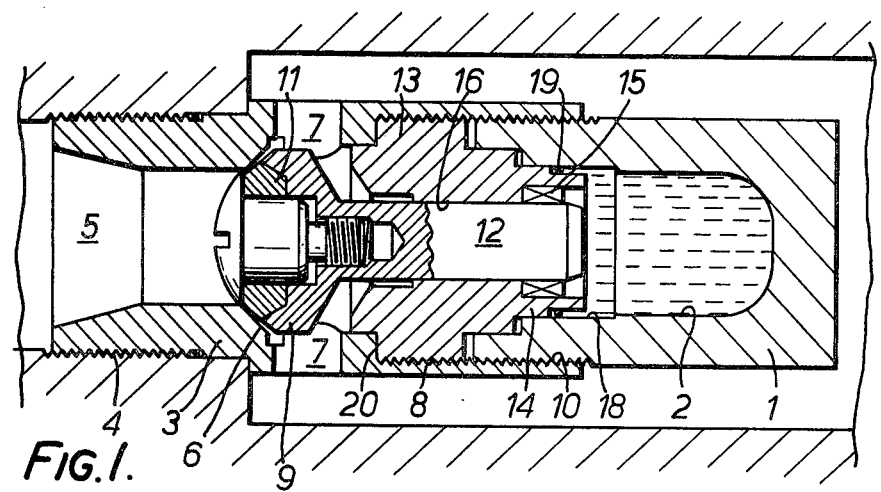

United States Patent [19]

Dowty, deceased et al.

[11] 4,091,838
[45] May 30, 1978

[54] PRESSURE RELIEF VALVE

[75] Inventors: George Herbert Dowty, deceased, late of near Castletown, Isle of Man, by Marguerite Anne Gowans Dowty, personal representative; by Virginia Anne Lilley, personal representative, Malew, Isle of Man; by Lionel Barber, personal representative, St. Brelades, Jersey, Channel Islands; by Peter James Kneale, personal representative, Douglas, Isle of Man

[73] Assignee: Dowty Mining Equipment Limited, England

[21] Appl. No.: 719,590

[22] Filed: Aug. 30, 1976

[30] Foreign Application Priority Data

Sep. 9, 1975 United Kingdom ............... 36950/75

[51] Int. Cl.² ..................... F16K 17/02; F16K 21/04
[52] U.S. Cl. .................................. 137/528; 137/514.5; 267/65 R
[58] Field of Search .................. 91/168; 137/528, 529, 137/514.5; 267/65 R

[56] References Cited

U.S. PATENT DOCUMENTS

| 677,776 | 7/1901 | Devantery | 137/514.5 |
| 2,429,658 | 10/1947 | Young | 137/529 |
| 2,598,630 | 5/1952 | Winberg | 137/528 |
| 3,437,110 | 4/1969 | Birdwell | 137/528 |
| 3,557,826 | 1/1971 | Albrecht | 137/529 |
| 3,838,625 | 10/1974 | Bell et al. | 91/168 |
| 3,947,004 | 3/1976 | Taylor | 267/65 R |

FOREIGN PATENT DOCUMENTS 1,276,099   6/1972   United Kingdom ................. 137/528

Primary Examiner—Paul E. Maslousky
Attorney, Agent, or Firm—Young & Thompson

[57] ABSTRACT

A fluid pressure relief valve in which the resilient element for urging the valve closure member to its seat is a quantity of liquid trapped in a container such that movement of the closure member from its seat reduces the volume of the confined liquid elastically without substantial elastic enlargement of the container. A plunger may extend from the valve closure member into the container and may be of smaller cross-sectional area than the effective area of the closure member which is exposed to the pressure of fluid controlled by the valve. In this way liquid pressure in the container may be higher than the pressure of fluid controlled by the valve when the valve opens.

3 Claims, 3 Drawing Figures

U.S. Patent

May 30, 1978

4,091,838

PRESSURE RELIEF VALVE

This invention relates to a fluid pressure relief valve, particularly intended for operation at high pressures.

A fluid pressure relief valve opens to vent fluid from a pressure source to a low pressure zone when the pressure of the fluid from the source exceeds a predetermined relative value. The valve structure normally includes a valve closure member urged onto a seat by a resilent element to close the vent passage, pressure of the fluid generating a force on the closure member in the opening sense and acting when the pressure reaches the predetermined value to open the valve to vent the pressure fluid. Where the predetermined pressure is high and the vent flow passage is capable of substantial flow rate, the resilient element is normally of substantial size. The object of this invention is to provide a relief valve structure for operation at high pressures, in which the resilient element may be of comparatively small size.

In accordance with the present invention, a fluid pressure relief valve is provided which comprises a valve closure member and a body member having a seat with which the closure member cooperates. A container is fixedly connected to the body member; and a quantity of liquid or liquid-like material fills the container at a predetermined preload pressure. A main plunger moves relative to the container to change the volume and pressure of the liquid or liquid-like material therein, the pressure of the liquid or liquid-like material within the container acting on the plunger to urge the valve closure member onto the seat. An auxiliary plunger surrounds the main plunger and is fixedly secured to the body member. A high pressure seal is mounted within the auxiliary plunger to engage the main plunger to retain the liquid or liquid-like material within the container. There is an entry flow passage to the seat, and a exit flow passage from the seat. The fixed connection of the container to the body member is effected by screw-threaded means whereby adjustment of the position of the container with respect to the position of the body member varies the extent by which the two plungers extend into the container and hence adjusts the predetermined preload pressure.

Figure 2:
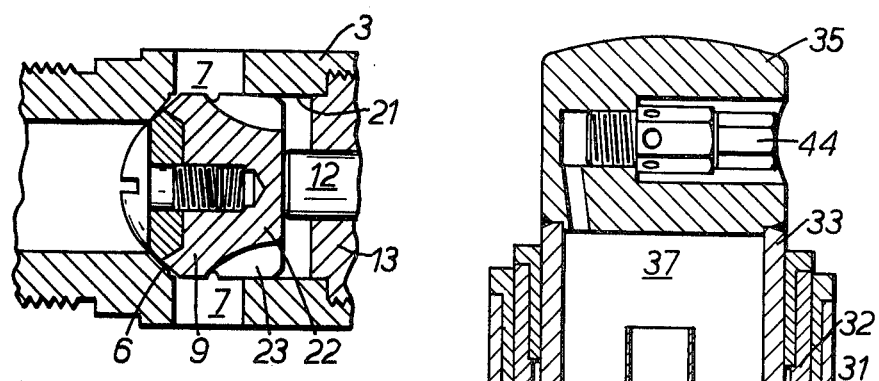
Figure 3:
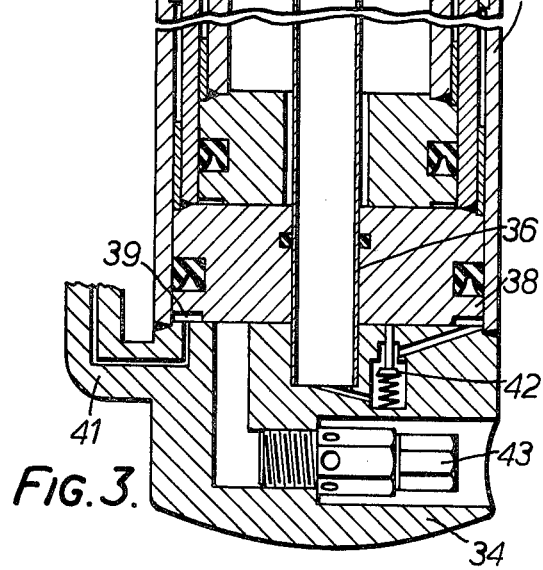

The invention will now be described by way of example with reference to the accompanying drawings, in which:

FIG. 1 is a longitudinal cross-section through a first embodiment of the invention, FIG. 2 is a longitudinal cross-section through a part of FIG. 1 which is of modified form, and FIG. 3 is a longitudinal cross-section through a hydraulic mine roof support having a pair of relief valves constructed as shown in FIG. 1.

Reference is made initially to FIG. 1 of the drawings. The relief valve includes a liquid chamber container 1, which is of thick walled construction to resist high liquid pressures without substantial enlargement of volume and which has a bore 2 open at one end. The external surface of the container 1 adjacent to the open end of the bore is provided with a screw thread 10.

The valve seat members 3 is formed with an external screw thread 4 at one end by which the valve may be secured in its operative position in a pit prop.

At that end an entry passage 5 enters the valve seat member terminating at a valve seat 6. On the opposite side of the seat there are one or more exit passages 7 for conducting fluid to a low pressure zone.

At its other end the valve seat member 3 has an internal screw thread 8 for engagement with the screw thread 10 on the container. Within the valve seat member a valve closure member 9 is located which may include a soft seating 11 of an appropriate plastics material. The soft seating 11 may be replaceable. The valve closure member 9 is integrally formed with a cylindrical plunger 12 which enters the open end of the bore 2 of the container.

The plunger 12 is supported for sliding movement with respect to the container by a guide 13, an annular plunger 14 formed as an extension of the guide 13 and a seal 15. The guide 13 and the auxiliary plunger 14 include a bore 16 within which the plunger 12 is a sliding fit. The seal 15 is located between the annular plunger 14 and the plunger 12 and may comprise any known form of seal capable of effective sealing operation at very high liquid pressures. The annular plunger 14 fits within a machined bore 18 which forms the outer end of the container bore 2. A seal 19 is located between the bore 18 and the annular plunger 14.

In order to assemble the valve the container 1 is supported in a convenient support with its open end uppermost and the bore 2 is filled with liquid, for example a silicone liquid. The valve seat member 3, the valve closure member 9, the guide 13, the plunger 12 and the seals 15 and 19 are assembled as a unit which is placed on the open end of the container. The valve seat member 3 is then rotated with respect to container 1 so that the screw threads 8 and 10 are engaged, and the annular plunger 14 enters the container bore 2, excess liquid being spilled in the process. When the seal 19 engages the bore 18 preventing further leakage, the valve seat member is then screwed onto the container so that co-operating shoulders 20 of the valve seat member and the guide engage one another to urge the annular plunger 14 into the container to compress the liquid therein and to urge the plunger 12 outwardly so that the closure member 9 engages the seat 6. The screwing of the seat member onto the container is then continued, urging both the plunger 12 and the annular plunger 14 into the container to compress the liquid therein and raise it to a desired pressure which corresponds to a predetermined fluid preload pressure in the entry passage 5 at which the valve member 9 will lift from its seat.

For the purpose of screwing the valve seat member onto the container both the valve seat member 3 and the container are provided with external hexagonal shapes. When screwing the assembled relief valve into its operative position a suitable hexagonal box spanner is provided to engage on the valve seat member 3 to rotate the screw thread 4 in a corresponding thread of the machine to which the relief valve is fitted. The fitting of the valve is normally such that the exit passages 7 may vent to atmosphere over the hexagonal surfaces of the valve seat member and the container.

In FIG. 2 similar reference numerals are used to indicate similar parts as in FIG. 1. The basic difference between FIG. 2 and FIG. 1 is that the plunger 12 and the valve closure member 9 are formed separately from one another, the plunger 12 bearing on the closure member 9 to urge onto its seat. The valve seat member 3 is provided with an internal bore 21 within which a cylindrical part 22 of the valve member having slots 23 is arranged to slide in order to guide the closure member 9 onto seat 6. The advantage obtained by the FIG. 2 construction is that the need for high accuracy of alignment between plunger 12 and valve seat 6 is avoided thus making the relief valve more simple to construct.

The relief valve of the invention is most usefully applied to a hydraulic mine roof support and one example of such a support is shown in FIG. 3. This example is a double extension prop which comprises an outer cylinder 31, an intermediate cylinder 32 and an inner plunger 33. The outer cylinder 31 has a floor-engaging pad 34 secured thereto whilst the inner plunger 33 has the roof-engaging pad 35 secured thereto. Internally of the support, a tube 36 is secured in the floor pad 34 to extend coaxially through the cylinders into the working space 37 within the plunger 33. The lower end of the intermediate cylinder 32 is provided with a piston 38 which sealingly engages the inner surface of the outer cylinder 31 and also the outer surface of the tube 36, to define a working space 39 between piston 38 and floor pad 34. The inner plunger 33 sealingly engages the inner surface of the intermediate cylinder 32. A prop filling connector 41 on the floor pad 34 connects directly to the working space 39. Within floor pad 34 a filling valve 42 is provided which controls the flow of liquid from working space 39 through tube 36 to working space 37. The roof support thus described is conventional. In accordance with the invention, however, the roof support is provided with a pair of high pressure relief valves 43 and 44, the relief valve 43 being in direct connection with the working space 39 and the relief valve 44 being in direct connection with the working space 37. Each of the relief valves 43 and 44 is of the form shown in FIG. 1. The pressure settings of the two valves 43 and 44 are slightly different from one another in that valve 43 will open at a somewhat lower pressure than valve 44. For preference the opening pressures of the two valves are arranged inversely in proportion to the cross-sectional areas of the two working spaces 37 and 39, whereby over the whole stroke of the mine roof support the yielding load on the roof support will be substantially constant.

In the valve construction as shown in FIGS. 1 and 2, the cross-sectional area of the plunger 12 is considerably smaller than the cross-sectional area of the closure member 9 exposed in the entry passage 5 whereby the opening fluid pressure for the valve is considerably less than liquid pressure in container 2. For example, as shown, the fluid pressure for opening the valve 9 is only one-third of the liquid pressure in container 1. The volume in the container 1 is preferably considerably larger than the volume of liquid displaced by the plunger 12 during full opening movement. As shown in FIG. 1, the container volume is about 25 times the maximum displacement of plunger 12 for full valve opening. In order to control the predetermined pressure of the valve to a fluid pressure of 5,000 p.s.i. the desired or preload pressure in container 1 may be set to 16,000 p.s.i. If the valve plunger opens to its full extent the pressure of the liquid in container 1 will rise to about 24,000 p.s.i. Very rapid increase in pressure within a roof support as shown in FIG. 3, due for example to rock burst conditions in the roof, will cause the pressure to rise rapidly to the predetermined value at which the valve will open. Since the valve is large the permitted flow rate is very substantial and the increase in pressure over the predetermined pressure to maintain the valve in its open condition is not very much. For example, as shown, the valve will permit rapid prop collapse for a 15% increase in pressure over the predetermined pressure. This results from the fact that the liquid, whilst giving a very high load to the valve closure member, also has a very low spring rate which will enable the valve closure member to lift substantially from its seat without a very large increase in pressure above the predetermined pressure.

The liquid used in the container 1 is for preference a silicone liquid which has a considerably greater compressibility than the average liquid. A silicone liquid may, for example, be compressed by about 10% of its volume at 20,000 p.s.i.

What is claimed is:

1. A fluid pressure relief valve comprising a valve closure member, a body member having a seat with which the closure member cooperates, a container fixedly connected to the body member, a quantity of liquid or liquid-like material filling the container at a predetermined preload pressure, a main plunger movable relatively to the container to change the volume and pressure of the liquid or liquid-like material therein, the pressure of the liquid or liquid-like material within the container acting on the plunger to urge the valve closure member onto the seat, an auxiliary plunger surrounding the main plunger and fixedly secured to the body member, a high pressure seal mounted within the auxiliary plunger to engage the main plunger to retain the liquid or liquid-like material within the container, an entry flow passage to the seat, and an exit flow passage from the seat, said fixed connection of the container to the body member being by way of screw-thread means whereby adjustment of the position of the container with respect to the position of the body member varies the extent by which the two plungers extend into the container and, hence, adjusts the predetermined preload pressure.

2. A fluid pressure relief valve as claimed in claim 1, wherein the area of the valve closure member exposed to fluid pressure in the entry flow passage is greater than the cross-sectional area of the main plunger.

3. A fluid pressure relief valve as claimed in claim 1, wherein the volume of the container is considerably greater than the volume of liquid displaced by the plunger when the valve closure member is fully lifted from its seat.

* * * * *